United States Patent
Hwang et al.

(10) Patent No.: US 8,766,097 B2
(45) Date of Patent: Jul. 1, 2014

(54) ELECTRODE, AND ELECTRONIC DEVICE COMPRISING SAME

(75) Inventors: Ji Young Hwang, Daejeon (KR); In-Seok Hwang, Daejeon (KR); Yong Goo Son, Daejeon (KR); Min Choon Park, Daejeon (KR); Sungjoon Min, Daejeon (KR); Jiehyun Seong, Daejeon (KR)

(73) Assignee: LG Chem Ltd., Seoul (KR)

( * ) Notice: Subject to any disclaimer, the term of this patent is extended or adjusted under 35 U.S.C. 154(b) by 0 days.

(21) Appl. No.: 13/878,537

(22) PCT Filed: Dec. 29, 2011

(86) PCT No.: PCT/KR2011/010308
§ 371 (c)(1),
(2), (4) Date: Apr. 9, 2013

(87) PCT Pub. No.: WO2012/091487
PCT Pub. Date: Jul. 5, 2012

(65) Prior Publication Data
US 2013/0192872 A1    Aug. 1, 2013

(30) Foreign Application Priority Data

Dec. 30, 2010 (KR) .................. 10-2010-0139283

(51) Int. Cl.
*H01B 5/00* (2006.01)
*B05D 5/12* (2006.01)

(52) U.S. Cl.
USPC .......................................... 174/126.1; 427/58

(58) Field of Classification Search
USPC .......................................... 174/126.2; 427/58
See application file for complete search history.

(56) References Cited

U.S. PATENT DOCUMENTS

| | | | |
|---|---|---|---|
| 7,427,783 B2* | 9/2008 | Lee et al. | 257/88 |
| 7,947,519 B2* | 5/2011 | Lee et al. | 438/34 |
| 2010/0170696 A1* | 7/2010 | Yano et al. | 174/126.2 |
| 2012/0031647 A1 | 2/2012 | Hwang et al. | |

FOREIGN PATENT DOCUMENTS

| | | | |
|---|---|---|---|
| JP | 9-258248 A | | 10/1997 |
| JP | 09258248 A | * | 10/1997 |
| JP | 10-221702 A | | 8/1998 |
| JP | 10221702 A | * | 8/1998 |
| JP | 1999-144877 A | | 5/1999 |
| JP | 2007-056345 A | | 3/2007 |
| JP | 2007056345 A | * | 3/2007 |
| JP | 2008-097845 A | | 4/2008 |
| KR | 10-2010-0073034 A | | 7/2010 |
| KR | 1020100073034 A | * | 7/2010 |
| KR | 10-2010-0090670 A | | 8/2010 |

* cited by examiner

*Primary Examiner* — Timothy Thompson
*Assistant Examiner* — Rhadames J Alonzo Miller
(74) *Attorney, Agent, or Firm* — McKenna, Long & Aldridge, LLP.

(57) ABSTRACT

The present invention relates to an electrode comprising an auxiliary electrode comprising a conductive pattern and a main electrode provided on at least a portion of the auxiliary electrode to be electrically connected to the auxiliary electrode, and a manufacturing method thereof.

17 Claims, 12 Drawing Sheets

[Oxxon based etchant]

ELECTRODE, AND ELECTRONIC DEVICE COMPRISING SAME

The application is a national stage application of PCT/KR2011/010308, filed on Dec. 29, 2011, which claims priority from Korean Patent Application No. 10-2010-0139283, filed on Dec. 30, 2010, which is hereby incorporated herein in its entirety by reference.

TECHNICAL FIELD

The present invention relates to an electrode and an electronic device comprising the same. More particularly, the present invention relates to an electrode comprising an auxiliary electrode and an electronic device comprising the same.

BACKGROUND ART

Recently, a transparent electrode is required to be formed on an effective screen portion in an electronic device such as a display, a touch panel, or the like. To this end, a transparent conductive film formed of materials such as ITO, ZnO, or the like is used as an electrode, but the transparent conductive film has a problem in that conductivity is low. To improve the problem, attempts are being made to form an auxiliary electrode constituted by a metal pattern on a transparent conductive film electrode for the purpose of enhancing conductivity.

DETAILED DESCRIPTION OF THE INVENTION

Technical Problem

In the technical field to which the invention pertains, it is required to study an electrode that has excellent performance and is easily manufactured, an electronic device comprising the same, and a method of manufacturing an electrode.

Technical Solution

The present invention provides an electrode comprising an auxiliary electrode comprising a conductive pattern and a main electrode provided on at least a portion of the auxiliary electrode to be electrically connected to the auxiliary electrode.

According to the present invention, when an allowable thickness deviation of an element provided on the electrode is β %, a taper angle (α) of the conductive pattern of the auxiliary electrode may be represented by the following Equation 1.

$$0 \leq \alpha < \text{Arc}[(1-0.01 \times \beta)] \quad \text{[Equation 1]}$$

Further, the present invention provides an electronic device comprising the electrode.

Further, the present invention provides a method of manufacturing an electrode, comprising:
1) forming an auxiliary electrode comprising a conductive pattern on a substrate; and
2) forming a main electrode provided on at least a portion of the auxiliary electrode to be electrically connected to the auxiliary electrode.

Advantageous Effects

According to an exemplary embodiment of the present invention, it is possible to easily provide an electrode having excellent performance such as conductivity or the like and an electronic device comprising the same.

EXPLANATION OF REFERENCE NUMERALS AND SYMBOLS

10: Substrate
20: Auxiliary electrode
30: Main electrode
40: Organic material layer or additional electrode

BEST MODE

Hereinafter, the present invention will be described in more detail.

An electrode according to the present invention comprises an auxiliary electrode comprising a conductive pattern and a main electrode provided on at least a portion of the auxiliary electrode to be electrically connected to the auxiliary electrode. Unlike the related art, the auxiliary electrode according to the present invention has a buried structure in which the auxiliary electrode is positioned at a lower end of the main electrode.

In the related art, when an auxiliary electrode is used so as to improve conductivity of a main electrode, generally, the main electrode is first formed and the auxiliary electrode is formed thereon in consideration of stability and interlayer interface characteristics of elements provided on the main electrode. However, in the present invention, it is found out that when a taper angle of an auxiliary electrode pattern is controlled, and specifically, the taper angle is lowered, even though the main electrode is formed on the auxiliary electrode, stability of the elements provided on the electrode can be ensured and the interlayer interface characteristics are even better.

According to the present invention, when an allowable thickness deviation of an element provided on the electrode is β %, a taper angle (α) of the conductive pattern of the auxiliary electrode may be represented by the following Equation 1.

$$0 \leq \alpha < \text{Arc}[(1-0.01 \times \beta)] \quad \text{[Equation 1]}$$

Figure 1:
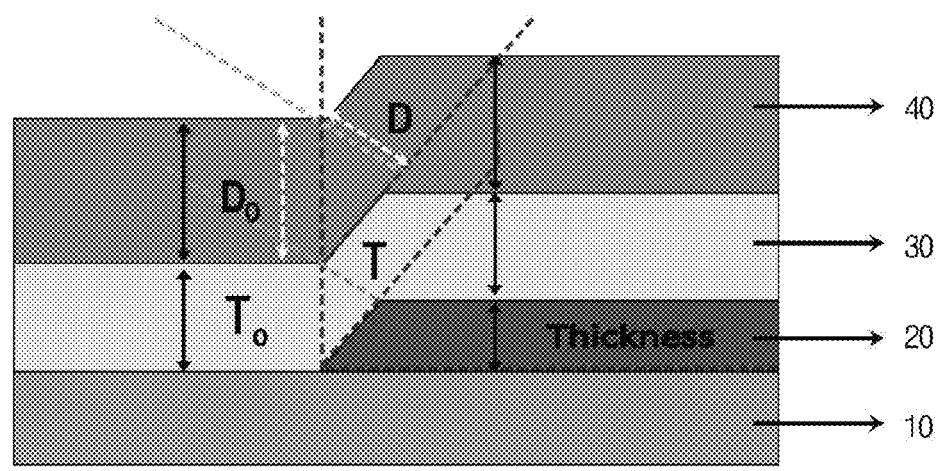
FIG. 1 is an exemplary diagram of a lateral structure of an electrode according to an exemplary embodiment of the present invention.

FIG. 1 is an exemplary diagram of a lateral structure of an electrode according to an exemplary embodiment of the present invention. If a taper angle of a conductive pattern of the auxiliary electrode is represented by α and a thickness at a flat surface of the main electrode provided thereon is represented by $T_0$, a thickness (T) of the main electrode at a slope inclined by the conductive pattern of the auxiliary electrode is defined as $T=T_0 \cos(\alpha)$. By similar equation, if a taper angle of the conductive pattern of the auxiliary electrode is represented by α and a thickness of the main electrode, for example, an element provided on the ITO main electrode, for example, a thickness at a flat surface of an organic material layer of an organic light emitting diode (OLED) is represented by $D_0$, a thickness (D) of an OLED material provided on a slope inclined by the conductive pattern of the auxiliary electrode is defined as $D=D0 \cos(\alpha)$. In the case of the element positioned on the main electrode, for example, an organic material layer of an organic light emitting diode or another electrode of a touch panel, assuming that an allowable thickness deviation is β %, the following Equation 2 may be represented.

$$(1-0.01 \times \beta) \times D_0 \leq D = D_0 \cos(\alpha) \leq D_0 \quad \text{[Equation 2]}$$

Therefore, it is found out that a permissible taper angle of the conductive pattern of the auxiliary electrode may be represented by Equation 1.

According to Equation 1, consequently, the allowable thickness deviation of the element positioned at an upper portion of the main electrode depends on the taper angle of the conductive pattern of the lower auxiliary electrode. For example, when a thickness deviation of the element positioned at the upper portion is applied to be 10% or less, the permissible taper angle of the conductive pattern of the auxiliary electrode is greater than approximately 0 and 25 degrees or less.

Further, the present inventors found out a method that may control and preferably lower the taper angle of the auxiliary electrode pattern.

According to an exemplary embodiment of the present invention, the taper angle of the auxiliary electrode pattern may be controlled by using a photolithography method or an indirect printing method. In this method, the taper angle of the auxiliary electrode pattern may be adjusted by controlling a soft-bake temperature or a composition of an etchant.

For example, in order to lower the taper angle of the auxiliary electrode pattern according to the present invention, the soft-bake temperature of a photoresist material may be controlled to 110° C. or less.

Figure 2:
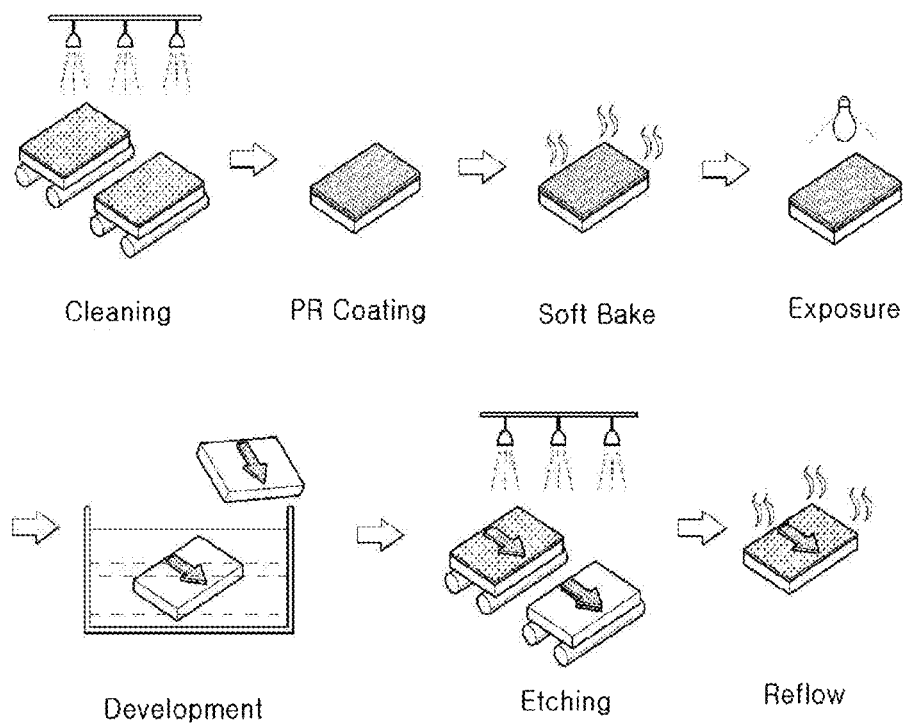
FIG. 2 illustrates an example of manufacturing an electrode according to the present invention by a photolithography process.
Figure 3:
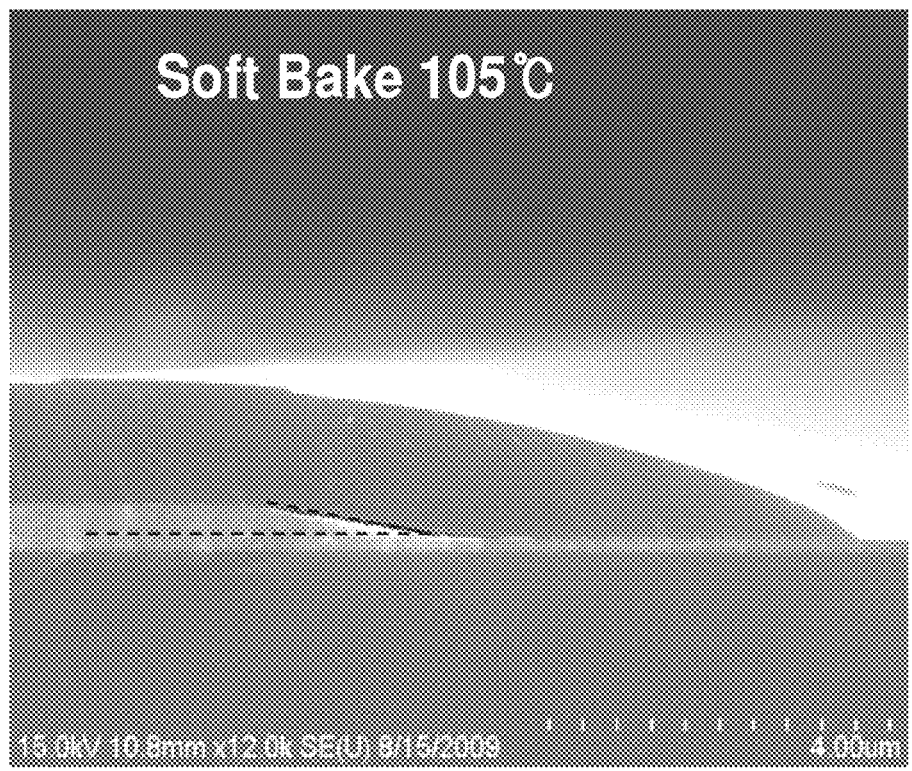
FIGS. 3 and 4 show taper angles of auxiliary electrode patterns depending on a soft-bake temperature in the photolithography process.
Figure 4:
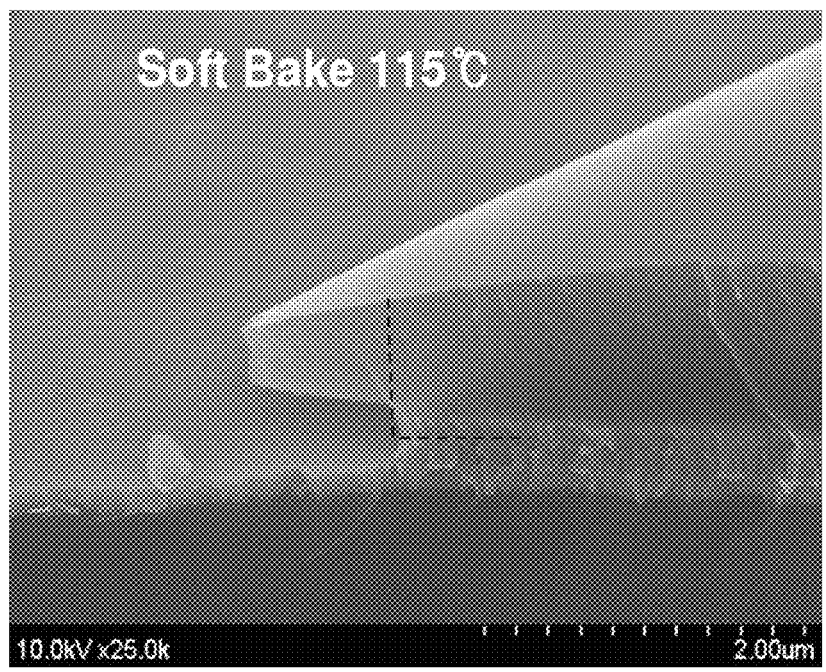

FIG. 2 illustrates an example of forming an auxiliary electrode by using a photolithography method. FIG. 2 is only for illustrating the present invention and the scope of the present invention is not limited thereto. FIG. 2 shows a photolithography process, comprising: forming a conductive layer for forming an auxiliary electrode on a substrate; coating photoresist on the conductive layer; forming a photoresist pattern by selective exposure and development; and forming a conductive pattern by etching the conductive layer which is not coated with the photoresist pattern. A taper angle of the auxiliary electrode pattern may be lowered by performing soft bake at 110° C. or less after coating the photoresist. FIGS. 3 and 4 each illustrate photographs in which patterns are formed when the soft bake is performed at 105° C. and when the soft bake is performed at 115° C. In this case, the photoresist pattern is formed to have a thickness of 1 micrometer. In this case, a preferable soft-bake temperature may be selectively applied through experiments by those skilled in the art depending on a resin constituting the photoresist and a kind of composition thereof, for example, a kind of a solvent, a coating thickness, and the like, however, it is advantageous that a soft-bake temperature is lower than a curing temperature of a material so as to ensure a low taper angle.

Figure 5:
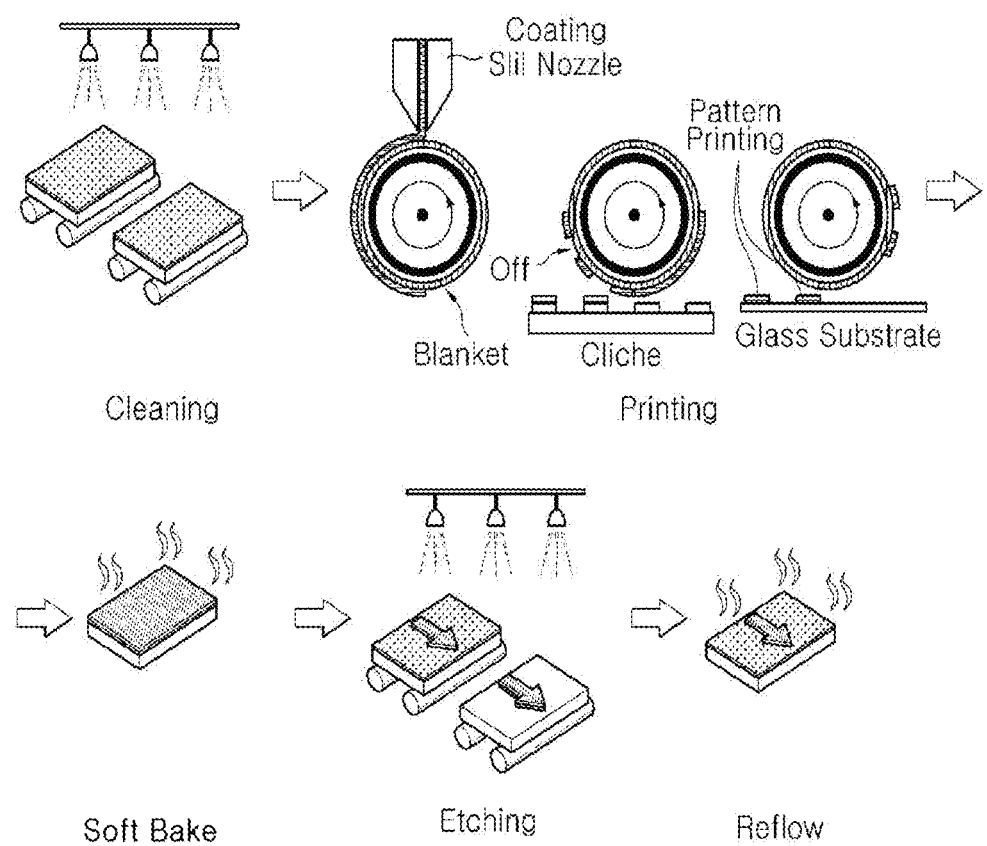
FIG. 5 illustrates an example of manufacturing an electrode according to the present invention by an indirect printing process.

FIG. 5 illustrates an example of forming an auxiliary electrode by using an indirect printing method. FIG. 5 is only for illustrating the present invention and the scope of the present invention is not limited thereto. Referring to FIG. 5, in an indirect printing process comprising forming a conductive layer for forming an auxiliary electrode on a substrate, printing a photoresist pattern on the conductive layer, and forming a conductive pattern by etching the conductive layer which is not coated with the photoresist pattern, a taper angle of the auxiliary electrode pattern may be lowered by performing soft bake at 80 to 90° C. after printing the photoresist pattern.

Figure 6:
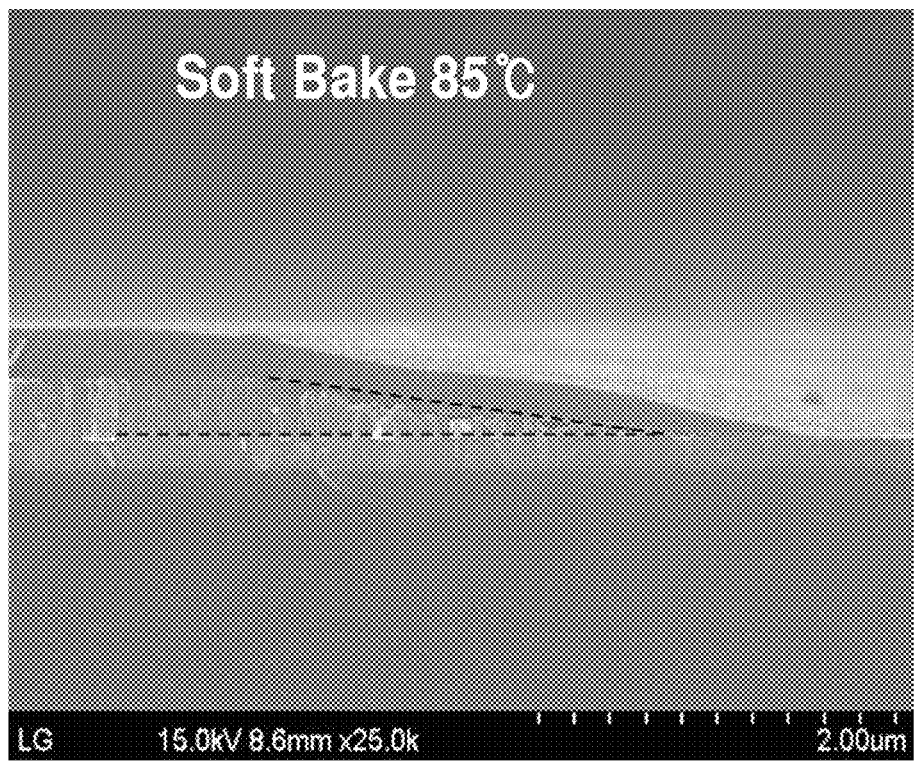
FIGS. 6 and 7 show taper angles of auxiliary electrode patterns depending on a soft-bake temperature in the indirect printing process.
Figure 7:
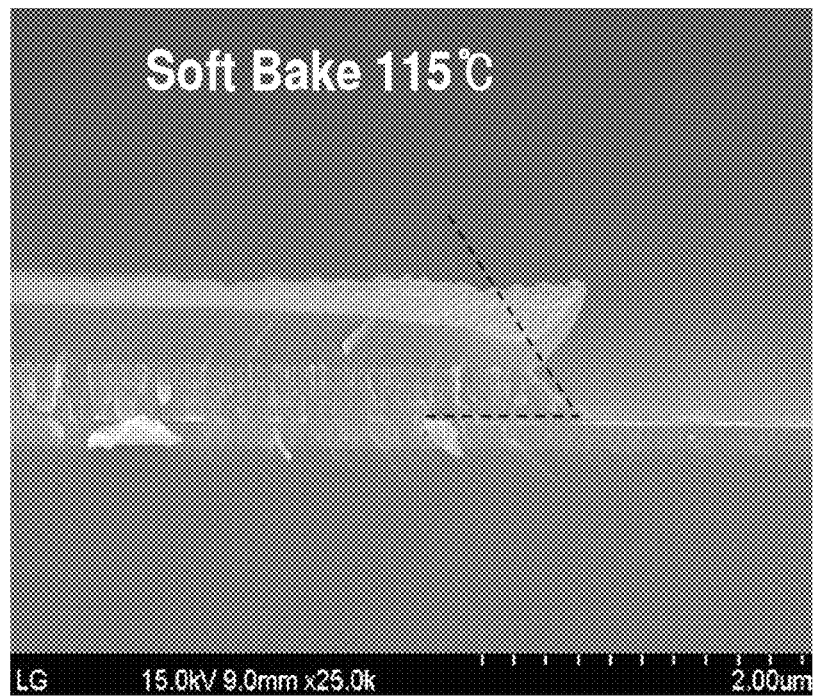

FIGS. 6 and 7 each illustrate photographs in which patterns are formed when the soft bake is performed at 85° C. and when the soft bake is performed at 115° C. In this case, the photoresist pattern is formed to have a thickness of 0.7 micrometer.

Before coating the photoresist, cleaning the conductive layer may be additionally comprised as necessary. Further, after forming the conductive pattern by etching the conductive layer, the photoresist may be removed.

As another example, in order to lower the taper angle of the auxiliary electrode pattern according to the present invention, an etchant of the conductive layer for forming the auxiliary electrode may be controlled.

Figure 8:
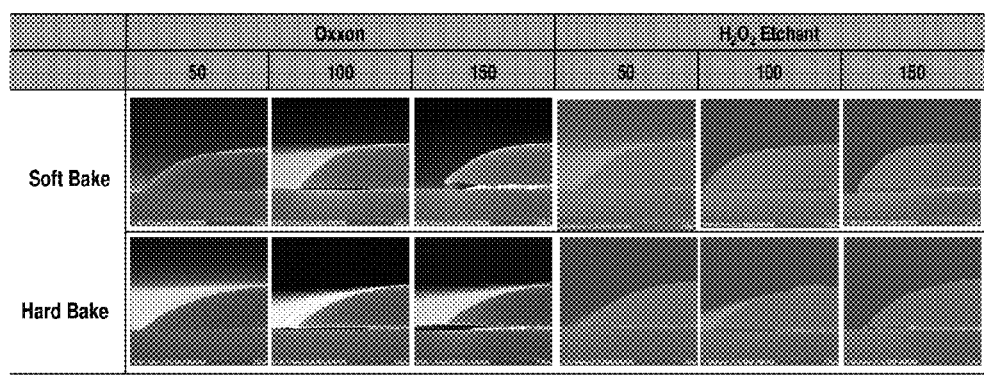
FIG. 8 shows a taper angle of an auxiliary electrode pattern depending on an etchant of the auxiliary electrode pattern in a photolithography process or an indirect printing process.

For example, in the case where a material of the conductive layer is copper (Cu), if an oxxon etchant is used, a low taper angle may be obtained under most conditions, but if an existing etchant is used, a high level of taper angle is exhibited regardless of whether soft bake or hard bake is performed. FIG. 8 illustrates a photograph showing taper angles of the conductive patterns when the oxxon etchant is used and when an existing hydrogen-peroxide etchant is used.

Figure 9:
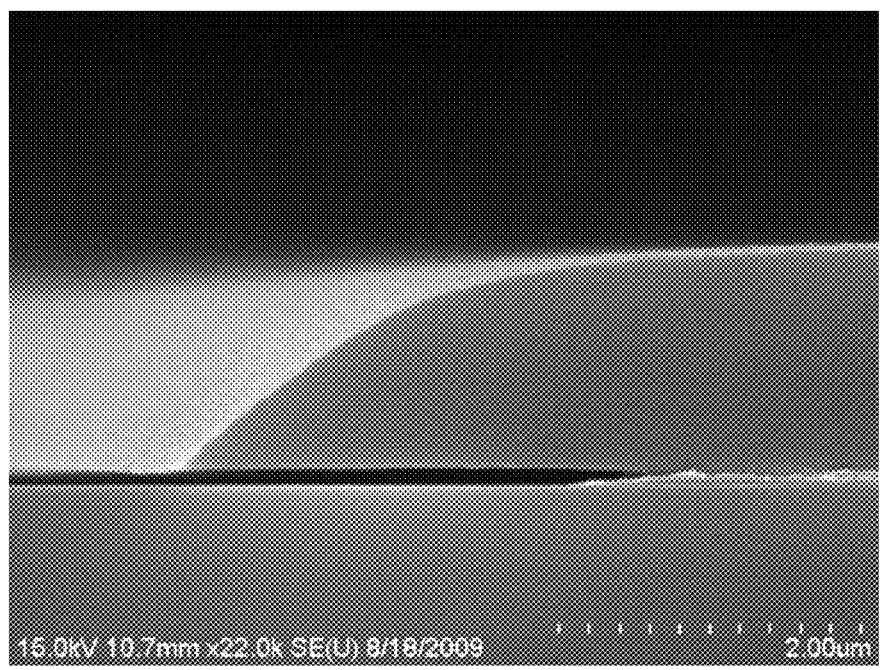
FIG. 9 shows a taper angle depending on a thickness of an auxiliary electrode pattern when an oxxon-based etchant is used. (Example)
Figure 9:
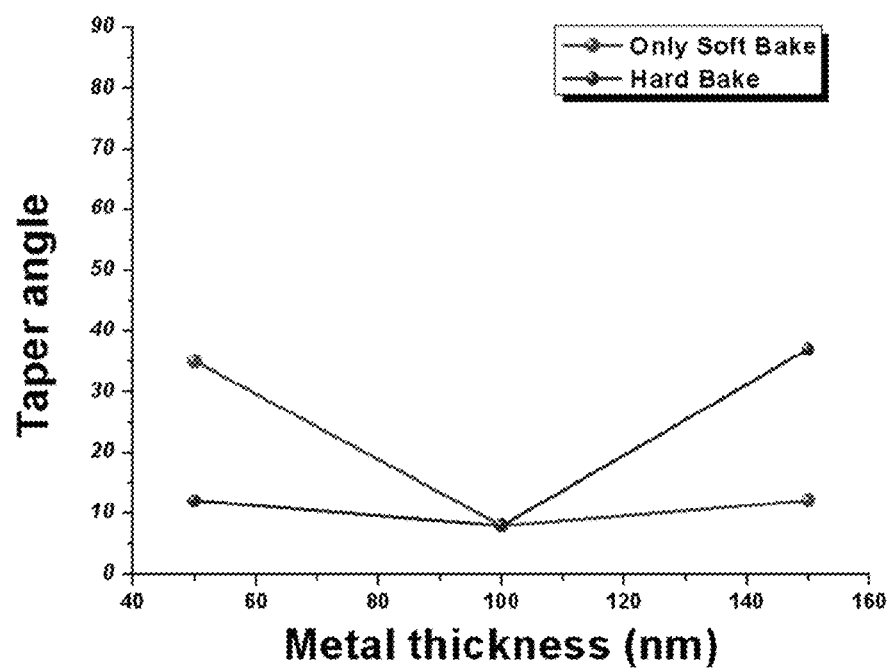
Figure 10:
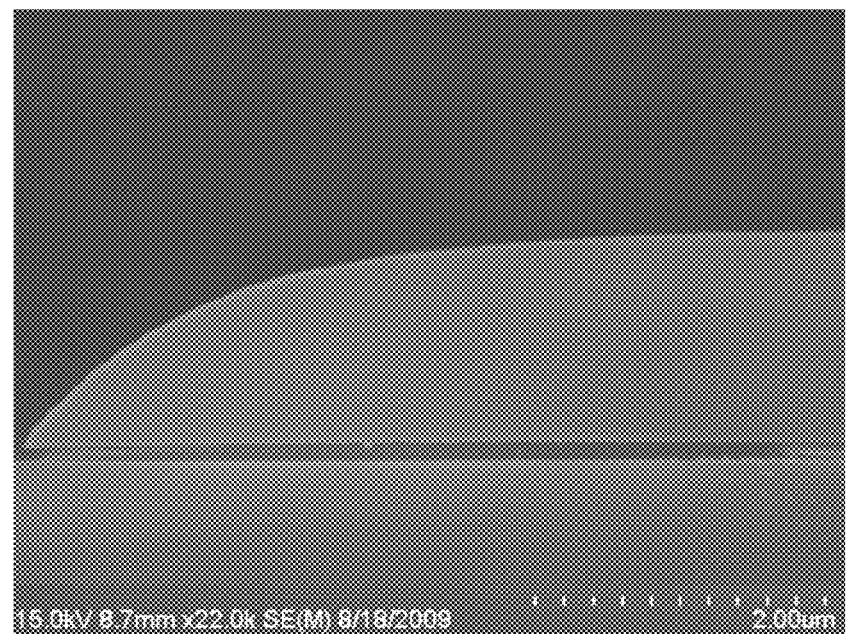
FIG. 10 shows a taper angle depending on a thickness of an auxiliary electrode pattern when a hydrogen-peroxide based etchant is used. (Comparative Example)
Figure 10:
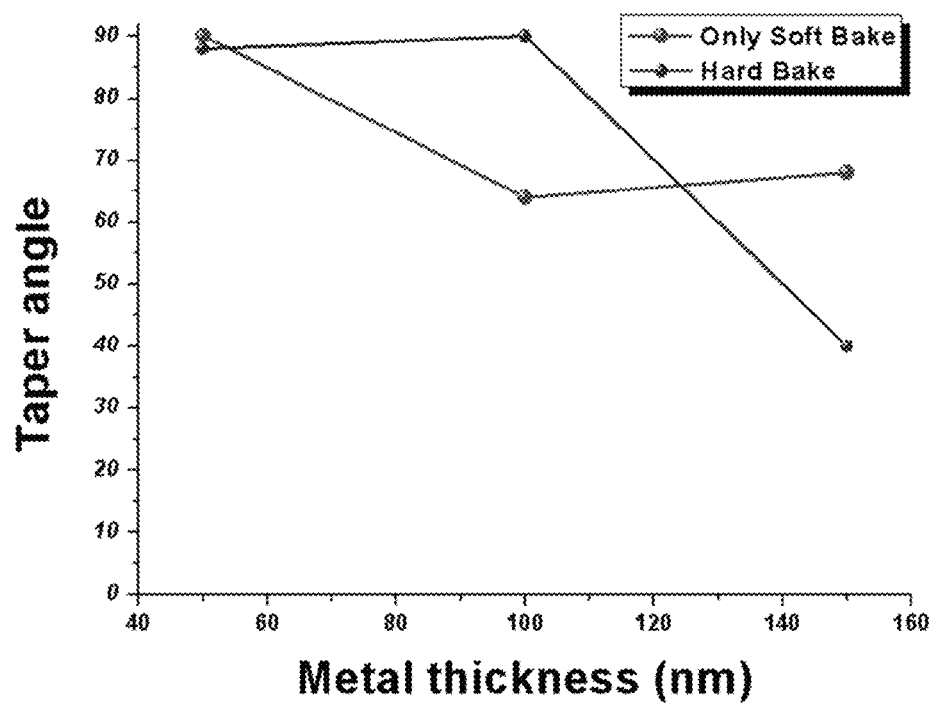

Further, FIG. 9 illustrates a taper angle depending on a thickness of the conductive pattern when the oxxon etchant is used and FIG. 10 illustrates a taper angle depending on a thickness of the conductive pattern when the existing hydrogen-peroxide etchant is used. The controlling of the taper angle of the conductive pattern using a change in a composition of the etchant, a change in an etching temperature, or the like may be implemented by increasing a content of nitric acid from existing 2% to approximately 5 to 15% on the basis of the existing etchant or increasing an etching temperature when an aluminum (Al) based material is used.

According to another exemplary embodiment of the present invention, a direct printing method may be used. In this method, the taper angle of the auxiliary electrode pattern may be controlled by using a reverse offset printing method or a gravure offset printing method. In the case of using the direct printing method, a conductive pattern having a low taper angle may be obtained regardless of the gravure printing method or the reverse printing method. This is considered as a phenomenon resulting from a contact pattern formation.

Figure 11:
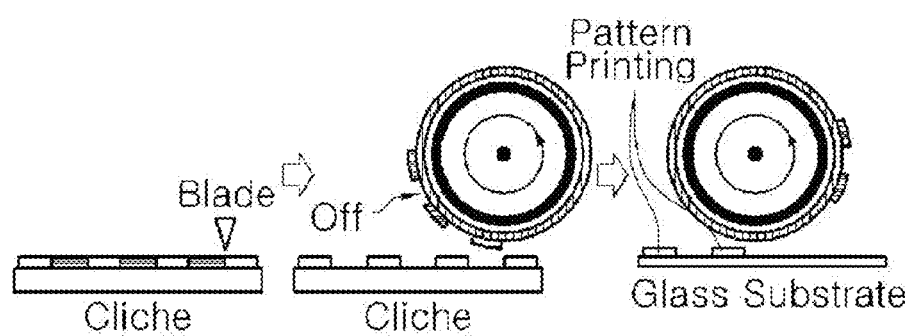
FIGS. 11 and 12 each show an example of manufacturing an electrode according to the present invention by a gravure offset printing process and the resultant photograph.
Figure 12:
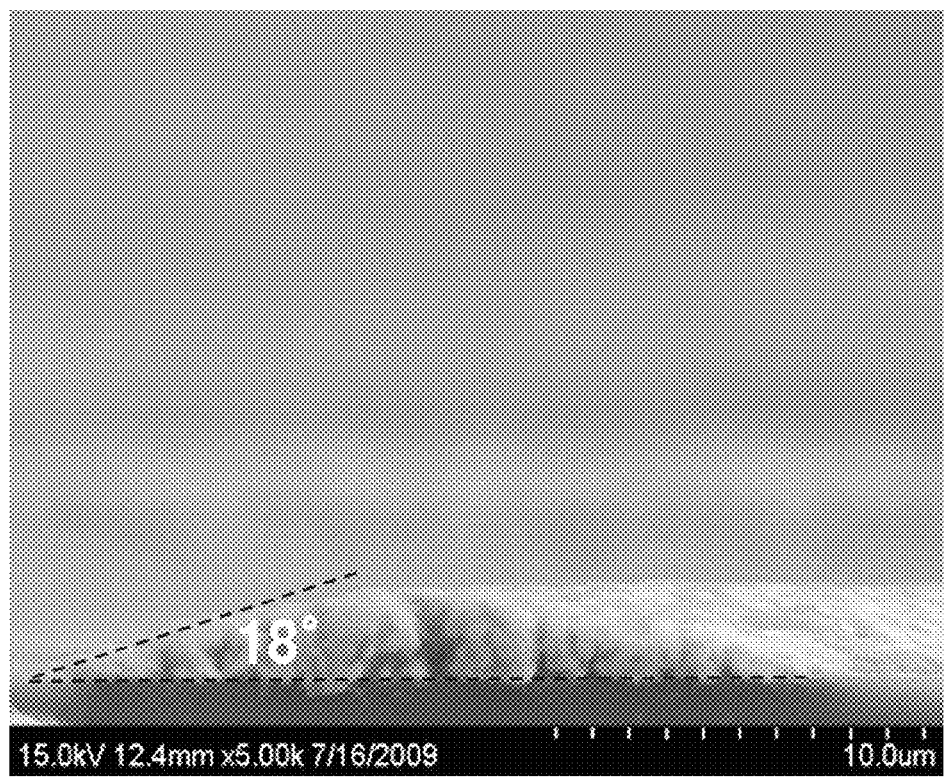
Figure 13:
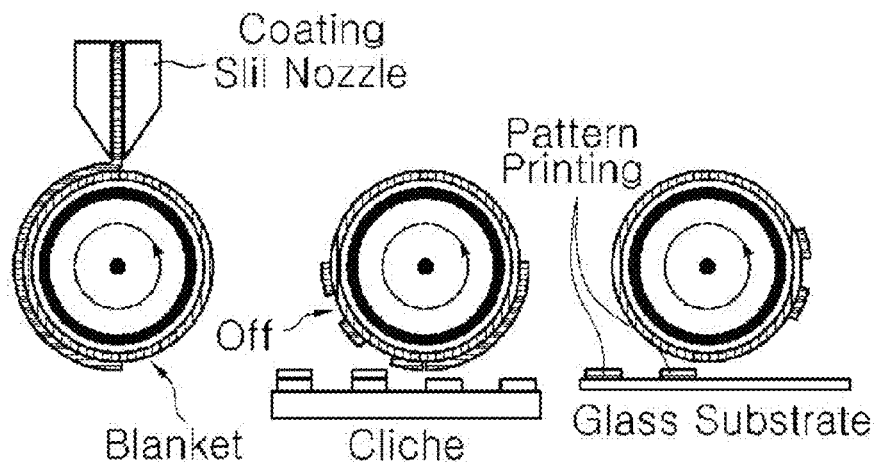
FIGS. 13 and 14 each show an example of manufacturing an electrode according to the present invention by a reverse offset printing process and the resultant photograph.
Figure 14:
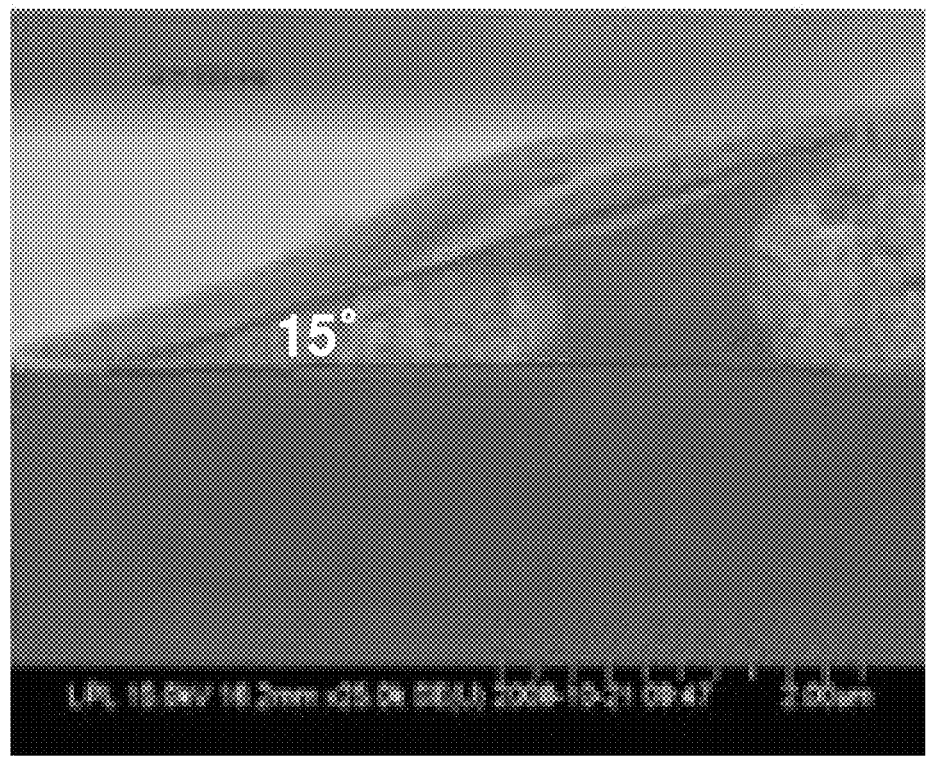

A process of using the gravure offset printing method is shown in FIG. 11 and a photograph of a conductive pattern formed according to the process is shown in FIG. 12. A process of using the reverse offset printing method is shown in FIG. 13 and a photograph of a conductive pattern formed according to the process is shown in FIG. 14.

As described above, it is possible to have a comparatively gradual stack coverage of the main electrode by forming an auxiliary electrode comprising the conductive pattern having a low taper angle to thereby form the main electrode thereon. Accordingly, it is possible to ensure stability of elements provided on the main electrode.

Figure 15:
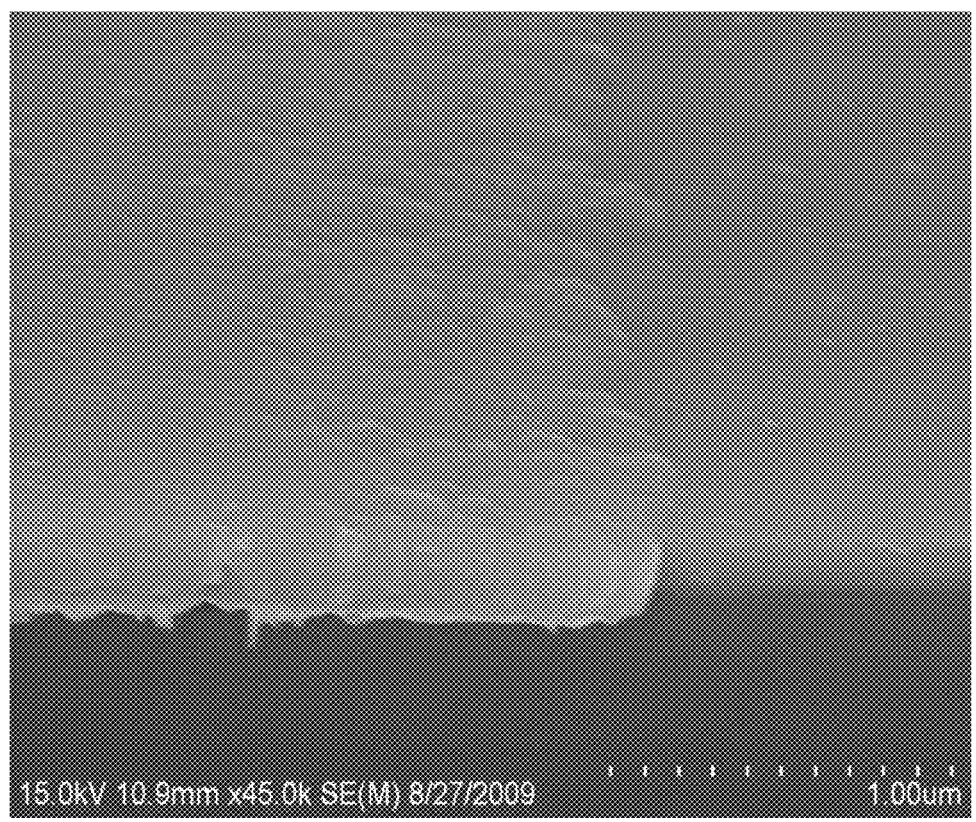
FIGS. 15 and 16 each are photographs illustrating a surface characteristic of electrodes manufactured in the Example and the Comparative Example.
Figure 16:
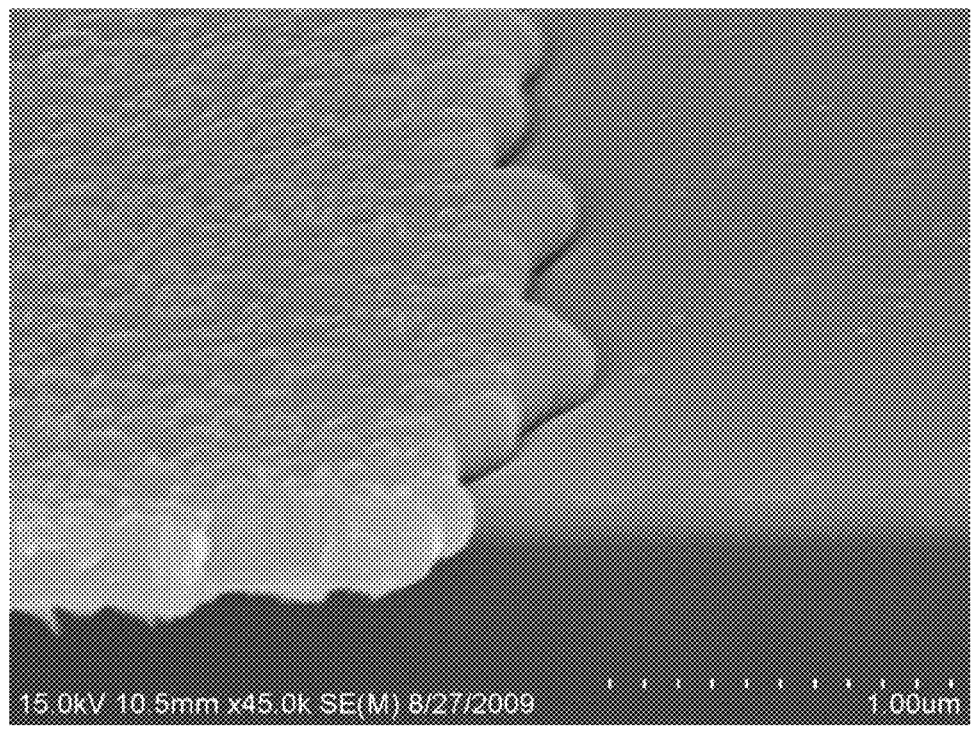

As a specific example, when a cross-sectional shape is observed after forming a conductive layer for forming an auxiliary electrode by depositing copper (Cu) on a glass substrate, coating photoresist, performing selective exposure and development, forming a conductive pattern by etching the conductive layer, and depositing an ITO layer as a main electrode thereon to have a thickness of 200 nm, photographs in the case of introducing the aforementioned conditions for forming the low taper angle in soft bake or etching and the case of not introducing the conditions are shown in FIGS. 15 and 16, respectively.

As shown in FIG. 15, in the case of forming the auxiliary electrode comprising the conductive pattern having the low taper angle, the stack coverage of the main electrode provided thereon is comparatively gradual, while as shown in FIG. 16, in the case of forming the auxiliary electrode comprising the conductive pattern having a large taper angle, the stack coverage of the main electrode provided thereon is not good. Further, in FIG. 16, a non-uniform deposition morphology of the main electrode is observed by an etching morphology in which a tail of the auxiliary electrode formed of copper (Cu) is irregular.

When the auxiliary electrode is formed by the photolithography process as the direct printing method, the auxiliary electrode has the taper angle of approximately 45 degrees. Further, when the auxiliary electrode is formed by the reverse offset process or the gravure offset process as the direct printing method, the auxiliary electrode may have the taper angle of approximately 5 to 30 degrees.

In the present invention, the conductive pattern of the auxiliary electrode may be formed by depositing or printing a conductive material. As the conductive material, metals such as silver, aluminum, copper, neodymium, molybdenum, or an alloy thereof may be used.

The thickness of the main electrode or the thickness of the auxiliary electrode may be increased depending on a surface resistance value of the entire electrode constituted by the auxiliary electrode and the main electrode, but when the auxiliary electrode is formed by a sputtering process, generally, the thickness of the auxiliary electrode is preferably approximately 50 nm to 2,000 nm.

The planar shape of the auxiliary electrode may have various pattern types such as a regular pattern structure, an irregular pattern structure, or the like.

In the present invention, the main electrode may be formed of a transparent conductive material. For example, ITO, IZO, and transparent conductive ink (Ag nanowire ink, a transparent conductive polymer, and the like) may be used. The main electrode may be formed according to the resistance value required by those skilled in the art as described above and when the main electrode is formed by using the sputtering process, the thickness thereof is preferably 50 nm to 2,000 nm.

In the present invention, the auxiliary electrode and the main electrode may be formed on a transparent substrate. The transparent substrate is not particularly limited and materials known in the art may be used. For example, glass, a plastic substrate, a plastic film, and the like may be used, but the materials are not limited thereto.

According to an exemplary embodiment of the present invention, it is preferable that the main electrode has a structure covering all of an upper surface and lateral surfaces of the auxiliary electrode. That is, in the present invention, the auxiliary electrode may be an auxiliary electrode having a buried structure.

Further, the present invention provides an electronic device comprising the electrode.

The electronic device comprises a touch panel, an organic light emitting diode, a display device, and the like.

When the electronic device according to the present invention is a touch panel, an element positioned on the main electrode may be another electrode. If necessary, an insulating layer may be provided between the main electrode and the another electrode. In this case, an allowable thickness deviation of the another electrode varies according to stiffness of components, for example, metal, but generally, a deviation at the level where a crack does not occur at the required thickness is preferable and the taper angle of the conductive pattern of the auxiliary electrode may be experimentally determined according to the preferable deviation.

When the electronic device according to the present invention is an organic light emitting diode, an element positioned on the main electrode may be an organic material layer and an upper electrode. A large thickness deviation of the organic material layer may negatively influence a lifespan of the diode. Since the thickness deviation of the organic material layer is preferably 0 to 10%, the taper angle of the conductive pattern of the auxiliary electrode is preferably 0 to 25 degrees.

Further, the present invention provides a method of manufacturing an electrode, comprising: forming an auxiliary electrode comprising a conductive pattern on a substrate; and forming a main electrode provided on at least a portion of the auxiliary electrode to be electrically connected to the auxiliary electrode. In the method according to the present invention, the photolithography method, the indirect printing method, or the direct printing method may be used and the detailed configuration is described above.

MODE FOR INVENTION

The present invention will be described in more detail through the following Example. However, the following Example is only for illustrating the present invention and the scope of the present invention is not limited thereto.

Example

Copper (Cu) was deposited to a thickness of approximately 100 nm by using a sputtering process and photoresist having a thickness of 1 micrometer was formed thereon by using LG412DF PR. Thereafter, the photoresist was subjected to soft bake at a temperature of approximately 125° C., etched by an oxxon based etchant (autonomously manufactured) and a hydrogen-peroxide based etchant (Cu etchant manufactured by ENF Technology Co., Ltd.), respectively, and then cleaned by a LGS100 stripper. Thereafter, ITO was deposited on each of the substrates to a thickness of approximately 200 nm by using an ITO sputter and the result is shown in FIG. 15.

When a taper angle of a conductive pattern was controlled to be small by adjusting an etchant, a stack coverage of the ITO was excellent, as shown in FIG. 15.

Comparative Example

The same manner as in Example 1 was performed except that the hydrogen-peroxide based etchant (Cu etchant manufactured by ENF Technology Co., Ltd.) was used as an etchant. The result thereof was shown in FIG. 16. Compared with FIG. 15, the stack coverage of the ITO was not good and a non-uniform deposition morphology of a main electrode was observed by an etching morphology in which a tail of an auxiliary electrode formed of copper (Cu) is irregular.

The invention claimed is:

1. An electrode, comprising:
an auxiliary electrode comprising a conductive pattern; and
a main electrode provided on at least a portion of the auxiliary electrode to be electrically connected to the auxiliary electrode,
wherein when an allowable thickness deviation of an element provided on the electrode is $\beta$ %, a taper angle ($\alpha$) of the conductive pattern of the auxiliary electrode is represented by the following Equation 1:

$$0 \leq \alpha < \arccos[(1 - 0.01 \times \beta)].$$ [Equation 1]

2. The electrode according to claim 1, wherein the allowable thickness deviation of the element provided on the electrode is 10% or less.

3. The electrode according to claim 1, wherein the conductive pattern of the auxiliary electrode has a taper angle of greater than 0 degree and 25 degrees or less.

4. The electrode according to claim 1, wherein the conductive pattern of the auxiliary electrode comprises silver, aluminum, copper, neodymium, molybdenum, or an alloy thereof.

5. The electrode according to claim 1, wherein the main electrode comprises a transparent conductive material.

6. The electrode according to claim 1, wherein the main electrode has a structure covering all of an upper surface and lateral surfaces of the auxiliary electrode.

7. An electronic device comprising an electrode according to claim 1.

8. The electronic device according to claim 7, wherein the electronic device is a touch panel, an organic light emitting diode or a display device.

9. A method of manufacturing an electrode, comprising:
1) forming an auxiliary electrode comprising a conductive pattern on a substrate; and
2) forming a main electrode provided on at least a portion of the auxiliary electrode to be electrically connected to the auxiliary electrode,
wherein when an allowable thickness deviation of an element provided on the electrode is $\beta$ %, a taper angle ($\alpha$) of the conductive pattern of the auxiliary electrode is represented by the following Equation 1:

$$0 \leq \alpha < \arccos[(1 - 0.01 \times \beta)].$$ [Equation 1]

10. The method according to claim 9, wherein the conductive pattern of the auxiliary electrode has a taper angle of greater than 0 degree and 25 degrees or less.

11. The method according to claim 9, wherein the auxiliary electrode is formed by a photolithography method and in this case, a soft-bake temperature of a photoresist material is controlled to 110° C. or less.

12. The method according to claim 9, wherein the auxiliary electrode is formed by an indirect printing method and in this case, a soft bake temperature of a photoresist material is controlled to 80 to 90° C.

13. The method according to claim 9, wherein the auxiliary electrode is formed by the photolithography method or the indirect printing method, and in this case, when a material of the auxiliary electrode comprises copper, an oxxon based etchant is used as an etchant.

14. The method according to claim 9, wherein the auxiliary electrode is formed by a reverse offset printing method or a gravure offset printing method.

15. An electronic device comprising an electrode according to claim 2.

16. An electronic device comprising an electrode according to claim 3.

17. An electronic device comprising an electrode according to claim 6.

* * * * *